United States Patent

[11] 3,573,860

[72] Inventor Louis Bentzman
  Levittown, Pa.
[21] Appl. No. 821,588
[22] Filed May 5, 1969
[45] Patented Apr. 6, 1971
[73] Assignee The Pennstar Company
  Warminster, Pa.

[54] DEVICE FOR DISPOSING OF SPENT GROUNDS
  6 Claims, 3 Drawing Figs.
[52] U.S. Cl. ............................................. 99/289
[51] Int. Cl. ......................................... A47j 31/00,
  A47j 31/44, A47j 31/60
[50] Field of Search ........................................ 99/279,
  280, 283, 289; 222/(Inquired)

[56] References Cited
UNITED STATES PATENTS
3,292,526 12/1966 Heier ............................ 99/289
3,349,690 10/1967 Heier ............................ 99/289
3,369,478 2/1968 Black ............................ 99/289
3,483,811 12/1969 Heier ............................ 99/289
3,496,861 2/1970 Stahler ......................... 99/289

Primary Examiner—Stephen J. Novosad
Attorney—Seidel and Gonda

ABSTRACT: Apparatus is provided for disposing of spent ground or powdered material used in beverage brewing machines. The apparatus includes an ejector member which is automatically activated by a carriage containing spent powdered beverage producing material to eject such spent material. The ground or powdered beverage producing material expands and forms a cakelike mass after a hot liquid has been passed therethrough. Accordingly, substantially the entire cake of powdered material is ejected by the ejector member. The ejector member is automatically returned to its inoperative position upon movement of the carriage to the brewing station.

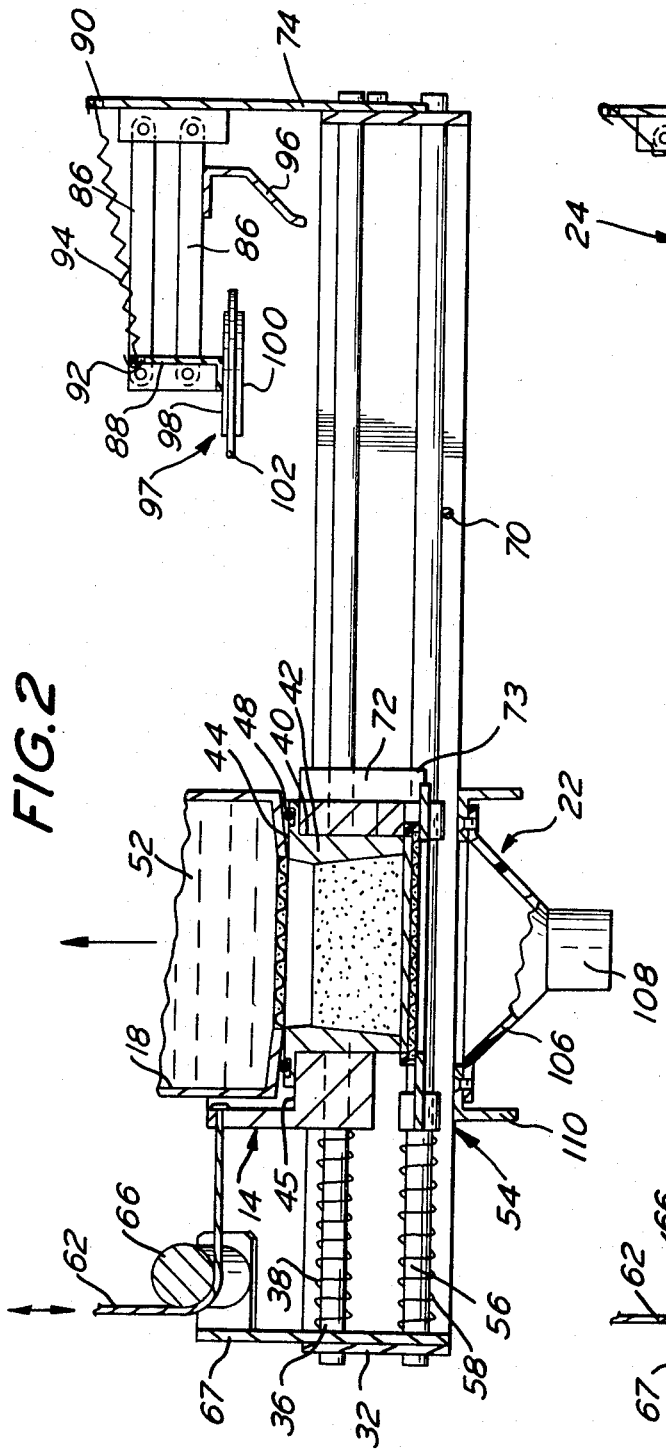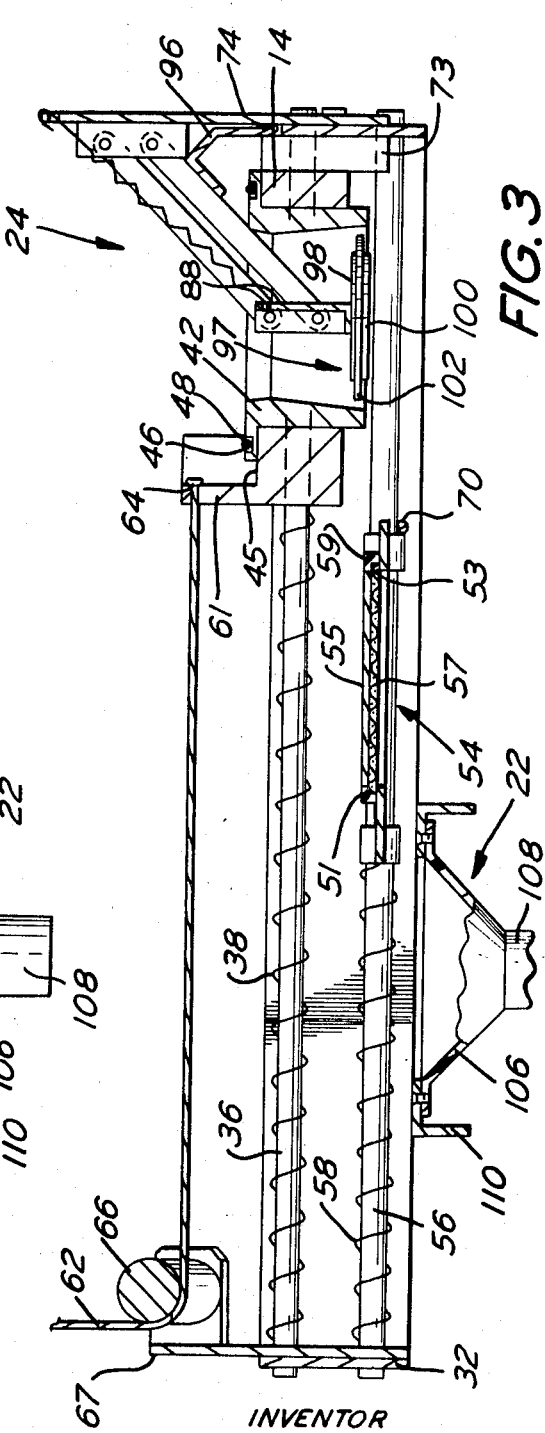
INVENTOR
LOUIS BENTZMAN
BY
Seidel, Gonda & Goldhammer
ATTORNEYS.

DEVICE FOR DISPOSING OF SPENT GROUNDS

The present invention relates to a device for disposing of spent grounds and, more particularly, to ejector apparatus which is utilized in beverage brewing apparatus for disposing of spent powdered or ground material within a brewing receptacle.

The ejector apparatus of the present invention is particularly adapted for use with beverage brewing apparatus such as the type disclosed in U.S. Pat. No. 3,349,690 assigned to the same assignee as the instant application. The disclosure of the beverage brewing apparatus in said U.S. patent is specifically incorporated herein by reference. It has been found that after a hot liquid, such as hot water, is forced through ground or powdered material, the hot liquid causes an expansion of such material and such material tends to form a single mass or cake. Hence, it has been heretofore proposed to dispose of the cake of material by severely jolting the receptacle. While the ground ejecting apparatus disclosed in Pat. No. 3,349,690 has functioned adequately, the uncontrolled jolt which caused ejection of the grounds may cause excessive wear to various parts after prolonged periods of use.

It is an object of the present invention to provide an ejector apparatus for ejecting grounds or powdered material from a receptacle in brewing apparatus.

It is another object of the present invention to provide an ejector apparatus wherein jolting of the various mechanisms is avoided.

It is a further object of the present invention to provide an ejector apparatus wherein an ejector member positively forces spent ground or powdered material from a receptacle in a brewing device.

It is yet another object of the present invention to provide an ejector apparatus which utilizes an ejector head which is automatically operated and which automatically returns to an inoperative position.

Other objects will appear hereinafter.

The above and other objects are accomplished by providing an ejector apparatus which includes a depending leg adapted to be in the path of a movable carriage. The movable carriage is provided with an abutment thereon. The movable carriage is also provided with a receptacle within which powdered or ground material is contained. Hot water is forced through the powdered or ground material at a brewing station. Thereafter, the receptacle having the spent grounds or powdered material therein is moved with the carriage to a retracted position. The abutment on the carriage will strike the depending leg on the ejector apparatus and cause the ejector head to enter the receptacle. The ejector head will force substantially the entire mass or cake of ground material through the receptacle into a suitable waste receptacle.

For the purpose of illustrating the invention there is shown in the drawings a form which is presently preferred; it being understood, however, that this invention is not limited to the precise arrangements and instrumentalities shown.

FIG. 2 is a section view taken along line 2—2 of FIG. 1; and

FIG. 3 is a section view similar to FIG. 2 showing the carriage in its retracted position.

Figure 1:
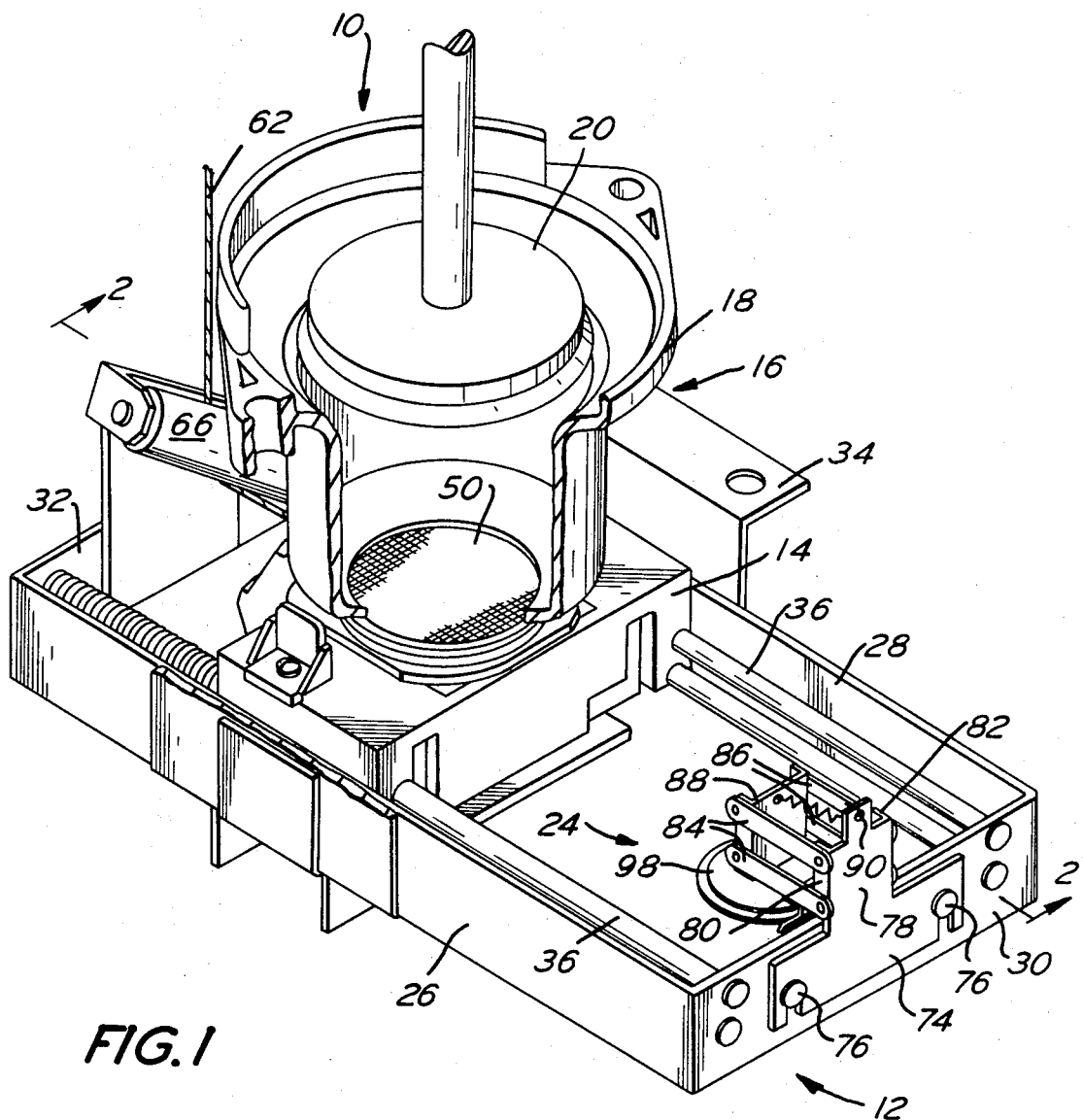
FIG. 1 is a perspective view, broken away in part, of apparatus including the present invention.

Referring now to the drawings in detail wherein like numerals indicate like elements throughout the several views, there is shown in FIGS. 1—3 beverage brewing apparatus indicated generally by the reference numeral 10. The apparatus includes a generally rectangular frame 12 having a movable carriage 14 supported thereon adapted to move between a brewing station 16 and a retracted position shown in FIG. 3. At the brewing station 16 there is provided a cylindrically shaped brewing member 18 having a piston 20 adapted to reciprocate therein. A drain structure 22 is located beneath the movable carriage 14 and is adapted to deliver brewed beverage to a cup. A ground ejecting device 24 is provided on one end of the frame 12.

The frame 12 includes sidewalls 26 and 28 and end walls 30 and 32. A support 34 may be secured to sidewall 20 to facilitate removably mounting the frame 12 in a dispensing machine.

A pair of rodlike rails 36 extend between the end walls 30 and 32 of the frame 12. A carriage 14 is supported by the rails 36 as clearly shown in FIGS. 1—3 of the drawing. A pair of springs 38 on the rails 36 urge the carriage 14 into the retracted position shown in FIG. 3.

Referring to FIG. 2, the carriage 14 is provided with a centrally disposed opening 40 therein. A sleevelike insert or receptacle 42 is received within the opening 40. The insert 42 has a flange 44 thereon which engages the planar surface 45 of the carriage 14. Spring means, not shown, may be provided to retain the insert 42 in its desired orientation. Alternatively, the insert 42 could be tightly frictionally engaged in the opening 40. A groove 46 is provided in the flange 44. A sealing O-ring 48 is provided in the groove 46 to insure a watertight seal between the receptacle 42 and the brewing member 18 during the brewing operation.

The brewing member 18 is adapted to have brewing liquid 52 therein. The brewing member 18 is provided with a mesh screen member 50 through which the brewing liquid is adapted to pass. The operation of the brewing apparatus is identical to that set forth in U.S. Pat. No. 3,349,690, and accordingly, need not be set forth herein in detail.

A subcarriage 54 is slidably mounted on a second pair of rails 56 located parallel to and slightly below the rails 36. The subcarriage 54 is urged by means of springs 58 into a position intermediate that of the retracted position of the carriage 14 and the brewing station 16.

The subcarriage 54 is provided with an orifice 53. A porous filter member 55 is supported by a filter support 51 and covers the orifice 53. While various types of filter members could be provided, the use of a filter formed of a stainless steel plate electroetched with extremely small holes having a diameter of about 0.005 inch is preferred. Such a filter presents an extremely smooth surface with holes so fine that there is practically no chance that they will be clogged by dirt, powder or grounds. A wiper (not shown) can be provided to wipe the filter clean. In preferred practice, the screen is etched in a circular pattern having an overall diameter about the same as that of the inside diameter of insert or receptacle 42. A support member such as a heavy wire mesh screen 57 may be placed in a groove 59 in the filter support 51 in order to prevent undue flexing of the filter member 55.

The carriage 14 is adapted to move from its retracted position shown in FIG. 3 to the brewing station 16 by a drive means not shown in detail.

The drive means includes a cable 62 which is attached to one end of an abutment 61 of the carriage 14. A bead 64 secured to one end of the cable 62 fits into a groove on the abutment 61. The cable is guided around an idler roller 66 which is attached to a support plate 67 which is secured to end wall 32 of the frame.

Suitable means is provided for winding and unwinding the cable 62 to effect movement of the carriage 14. Such means could be identical to the pulley system disclosed in U.S. Pat. No. 3,349,690. When the cable 62 is taken up, it will move the carriage 14 from the right-hand position shown in FIG. 3 to the brewing station beneath the cylinder 18 as shown in FIG. 2.

An abutment plate 72 on the carriage 14 has a lowermost lip 73 extending downwardly into the path of movement of the subcarriage 54. Upon movement of the carriage 14 toward the brewing station 16, the lip 73 will engage the subcarriage 54 and move the same to the brewing station 16. At this time, the insert 42 will be in registry with the subcarriage 54 and the insert and subcarriage form side and bottom wall portions of a cuplike receptacle capable of carrying a charge of fresh coffee or other material to be brewed to the brewing station 16.

A coffee hopper (not shown) may be located at the right-hand side of the cylinder 18. The hopper will deliver a predetermined quantity of fresh ground coffee or the like material into the insert 42 after the insert 42 has been withdrawn so that it is positioned over the subcarriage 54. The filter 55 will provide a base for the insert 42 as the ground material is dropped therein. A suitable stop 70 is provided to positively stop the subcarriage 54 from moving with the carriage 14 to its fully retracted position. As the cable 62 is unwound, both the carriage 14 and the subcarriage 54 will be urged to the right as viewed in FIGS. 2 and 3 by the springs 38 and 58. After the cable 62 has been unwound, the carriages will attain the positions shown in FIG. 3.

The ground ejecting device 24 is mounted on a support bracket 74 which is secured to the end wall 30 of the frame 12 by screws or rivets 76. The bracket 74 has an upstanding portion 78 integral therewith. The upstanding portion 78 has inwardly directed legs 80 and 82. A pair of links 84 are pivotably secured to the inwardly directed leg 80. A pair of links 86 are pivotably secured to the leg 82. A U-shaped bracket 88 is supported by the opposite ends of the links 84 and 86. The links 84 and 86 are pivotally connected to the U-shaped bracket 88.

The upstanding portion 78 is provided with a hole 90 adjacent its uppermost end. The U-shaped bracket 88 is provided with a hole 92 adjacent its uppermost end. A spring 94 has its ends engaged in the holes 90 and 92 and urges the ejecting device 24 into the position shown in FIGS. 1 and 2. The linkages 84 and 86 and their supporting structure define parallelograms which permit downward arcuate movement of the U-shaped bracket 88.

A downwardly projecting member 96 is secured to the lowermost link 84 and the lowermost link 86. The member 96 may be welded to the lowermost link 84 and the lowermost link 86. The member 96 is adapted to extend into the path of movement of the carriage 14. As the carriage 14 moves into its retracted position, the abutment plate 72 will engage member 96 and cause the linkages 84 and 86 to move downwardly and carry the U-shaped bracket 88 therewith as shown in FIG. 3.

The U-shaped bracket 88 has a circular head unit 97 secured thereto. The head unit 97 includes a circular head 98 spaced from an identical circular head 100 by a soft rubber silicone ring 102. The circular heads 98 and 100 may be secured together by means of screws, or similar interconnecting means. The U-shaped bracket 88 is secured to the head 98 in any desired manner. The bracket may be secured by screws, by spot-welding the bracket to the uppermost circular head 98 or in any other desired manner.

As shown in FIGS. 1—3, the diameters of the heads 98 and 100 are substantially identical and are substantially smaller than the diameter of the ring 102.

As carriage 14 moves into its retracted position, abutment plate 72 will contact member 96 and cause U-shaped bracket 88 and the circular head unit 97 to move down. The grounds or powdered material will have formed a substantially homogeneous mass or cake 104 since the hot brewing liquid will have already passed therethrough.

The head unit 97 will force the mass or cake 104 out of the insert 42 into a suitable waste receptacle. The interior walls of the insert 42 flare downwardly and outwardly to facilitate ejection of the cake 104 therefrom. The parallelogram linkages will cause movement of the head unit in an arcuate path while maintaining its movement. Movement of head unit 97 in a downward direction will be caused by abutment 73 contacting member 96. As the carriage 14 is moved toward the brewing station the spring 94 will cause the head unit to return to its uppermost position as depicted in FIGS. 1 and 2.

The ring 102 will be substantially the same diameter as the interior diameter of the insert 42 at the uppermost end of the insert 42. Hence, the head unit 97 including the soft rubber silicone ring 102 will engage the entire cake of grounds 104 and cause the same to move downwardly. The yieldable ring 102 may have a diameter slightly greater than the interior diameter of the insert 42 at the uppermost end thereof to thereby provide a wiping action by ring 102 with respect to the interior of insert 42.

The arcuate path of movement of head unit 97 permits rapid insertion and removal of the head unit into the insert 42 as the insert 42 is moved toward and away from its retracted position, respectively. Therefore, the entire cake 104 will be ejected from the insert 42.

The drain structure 22 is also mounted on the frame 12 and is positioned directly beneath and in axial alignment with cylinder 18 slightly below the subcarriage 54. The drain is provided with an outlet spout 106 communicating with a conduit 108. Conduit 108 communicates with a dispensing station wherein brewed liquid is dispensed to a prepositioned cup. The spout 106 is secured to a support plate 110 suitably connected to the frame 12.

The present invention may be embodied in other specific forms without departing from the spirit or essential attributes thereof.

I claim:

1. Apparatus comprising a frame having a beverage brewing station at one end thereof, a carriage movable between a retracted position and the beverage brewing station, a receptacle associated with said carriage for receiving ground powdered material adapted to have a hot beverage flow therethrough when said carriage is in said beverage brewing station, means for moving said carriage to said retracted position, ejector means mounted on said frame adjacent the retracted position, an abutment on said carriage, said ejector means having a downwardly depending member in the path of movement of said carriage so that said abutment means on said carriage will contact said downwardly depending member as said carriage is moved to said retracted position to cause said ejector means to enter said receptacle and force the spent powdered material out of said receptacle, said ejector means including a head unit having a generally circular shape and means for maintaining said head unit in a horizontal plane.

2. Apparatus as set forth in claim 1, wherein said head unit is moved through a generally arcuate path into said receptacle, and means for returning said ejector means to its original position upon movement of said carriage from said retracted position to the beverage brewing station.

3. Apparatus as set forth in claim 1, wherein said ejector means includes parallelogram linkage for moving said head unit about a generally arcuate path and said parallelogram linkage maintaining said head unit in a substantially horizontal plane throughout movement of said head unit.

4. Apparatus as set forth in claim 3, wherein said head unit includes a silicone rubber ring interposed between two metal plates, the diameter of said metal plates being substantially smaller than the diameter of said rubber ring.

5. An ejector mechanism for ejecting a cake of spent ground material from a receptacle in a movable carriage including a generally circular member having a downwardly depending member associated therewith, said ejector mechanism being supported by a generally rectangular frame, spring means interconnecting said ejector mechanism and said frame, said spring means being adapted to urge said circular member into an inoperative position, said downwardly depending member being positioned in the path of movement of the movable carriage whereby an abutment on the movable carriage will cause said circular member to move against the urging of said spring means to cause ejection of the cake of powdered material, and means for maintaining said circular member in a generally horizontal plane throughout its movement.

6. An ejector mechanism as set forth in claim 5, wherein said circular member is supported at the ends of a parallelogram linkage for movement about a generally arcuate path, the other ends of said parallelogram linkage being supported by said frame.